United States Patent [19]
Pearce

[11] Patent Number: 5,494,399
[45] Date of Patent: Feb. 27, 1996

[54] CAN END DISTRIBUTOR APPARATUS

[75] Inventor: Ronald A. Pearce, Lakewood, Colo.

[73] Assignee: Rapsco, Inc., Denver, Colo.

[21] Appl. No.: 20,106

[22] Filed: Feb. 19, 1993

[51] Int. Cl.⁶ .................................................. B65G 60/00
[52] U.S. Cl. ...................... 414/788.4; 198/803.15; 414/797.7
[58] Field of Search .................. 198/477.1, 803.14, 198/803.15; 221/278; 406/151; 414/788.4, 797.7

[56] References Cited

U.S. PATENT DOCUMENTS

| | | | |
|---|---|---|---|
| 2,108,522 | 2/1938 | Bergmann | 198/32 |
| 3,938,675 | 2/1976 | Rees . | |
| 3,960,257 | 6/1976 | High et al. | 414/797.7 X |
| 3,977,358 | 8/1976 | Stroobants | 118/2 |
| 4,262,629 | 4/1981 | McConnellogue et al. | 118/668 |
| 4,326,624 | 4/1982 | Ewertowski et al. | 198/370 |
| 4,391,372 | 7/1983 | Calhoun | 209/523 |
| 4,544,314 | 10/1985 | Partyka | 413/26 |
| 4,848,060 | 7/1989 | Kubis et al. | 53/308 |
| 4,874,076 | 10/1989 | Kaplan et al. | 198/370 |
| 5,113,636 | 5/1992 | Mihara et al. | 53/308 |
| 5,133,636 | 7/1992 | Hunt et al. | 414/755 |
| 5,151,001 | 9/1992 | Kawaguchi et al. | 198/803.15 X |
| 5,209,170 | 5/1993 | Kobayashi | 406/151 X |

Primary Examiner—Michael S. Huppert
Assistant Examiner—Janice L. Krizek
Attorney, Agent, or Firm—John E. Reilly

[57] ABSTRACT

A distributor apparatus is characterized by having a transfer starwheel with individual pockets which are successively advanced beneath a feeder unit, such as, a downstacker mechanism, each pocket having a ring gear and individual feed screw elements controlled by the ring gear to successively engage an outer rim of an individual can end advanced into the pocket by the downstacker and subsequently remove each end from the pocket through rotation of the ring gear when it moves into alignment with a discharge chute. One or more discharge chutes may be placed in the path of movement of the pockets of the transfer starwheel, and output level sensors at each discharge chute determine when ends are to be supplied to each chute.

16 Claims, 5 Drawing Sheets

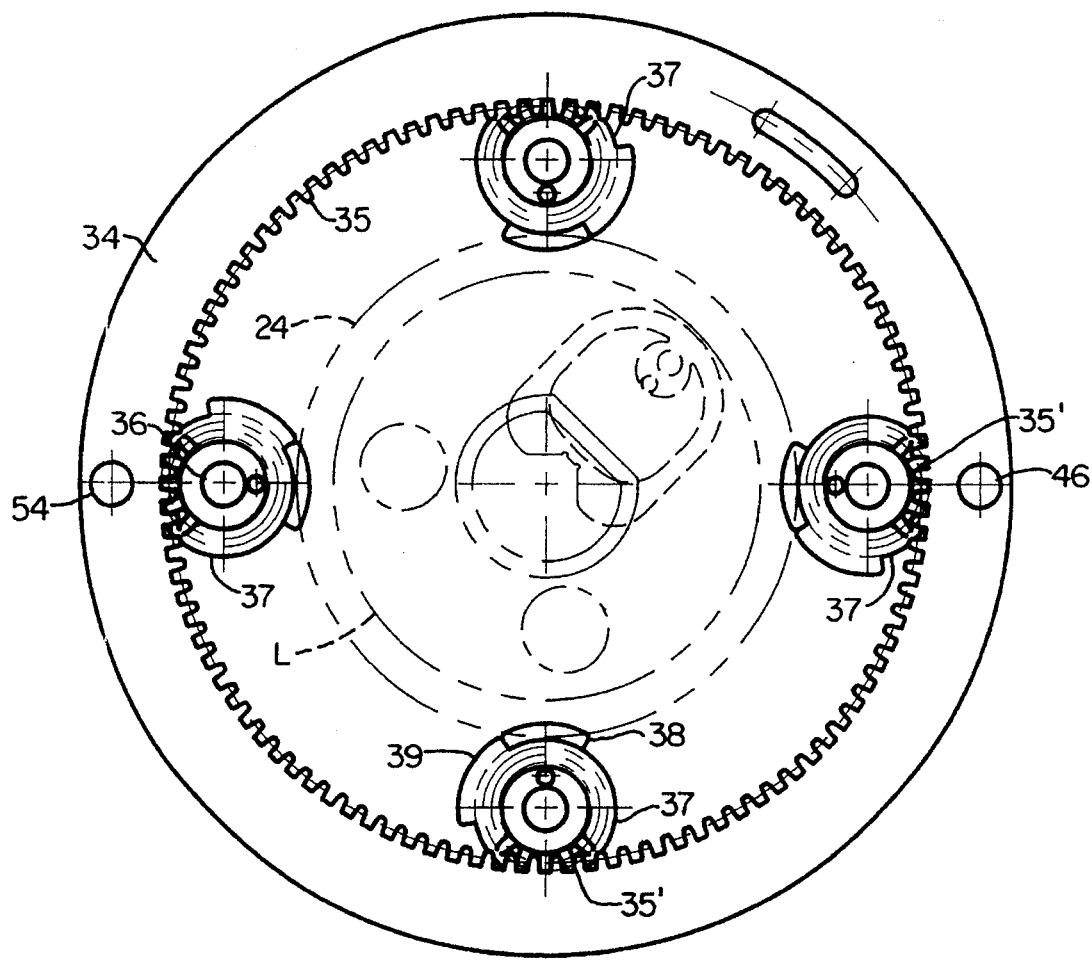
_FIG_ 4
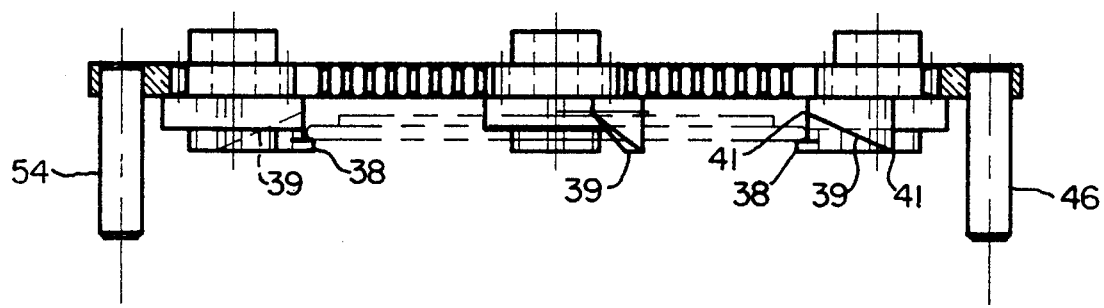
_FIG_ 5

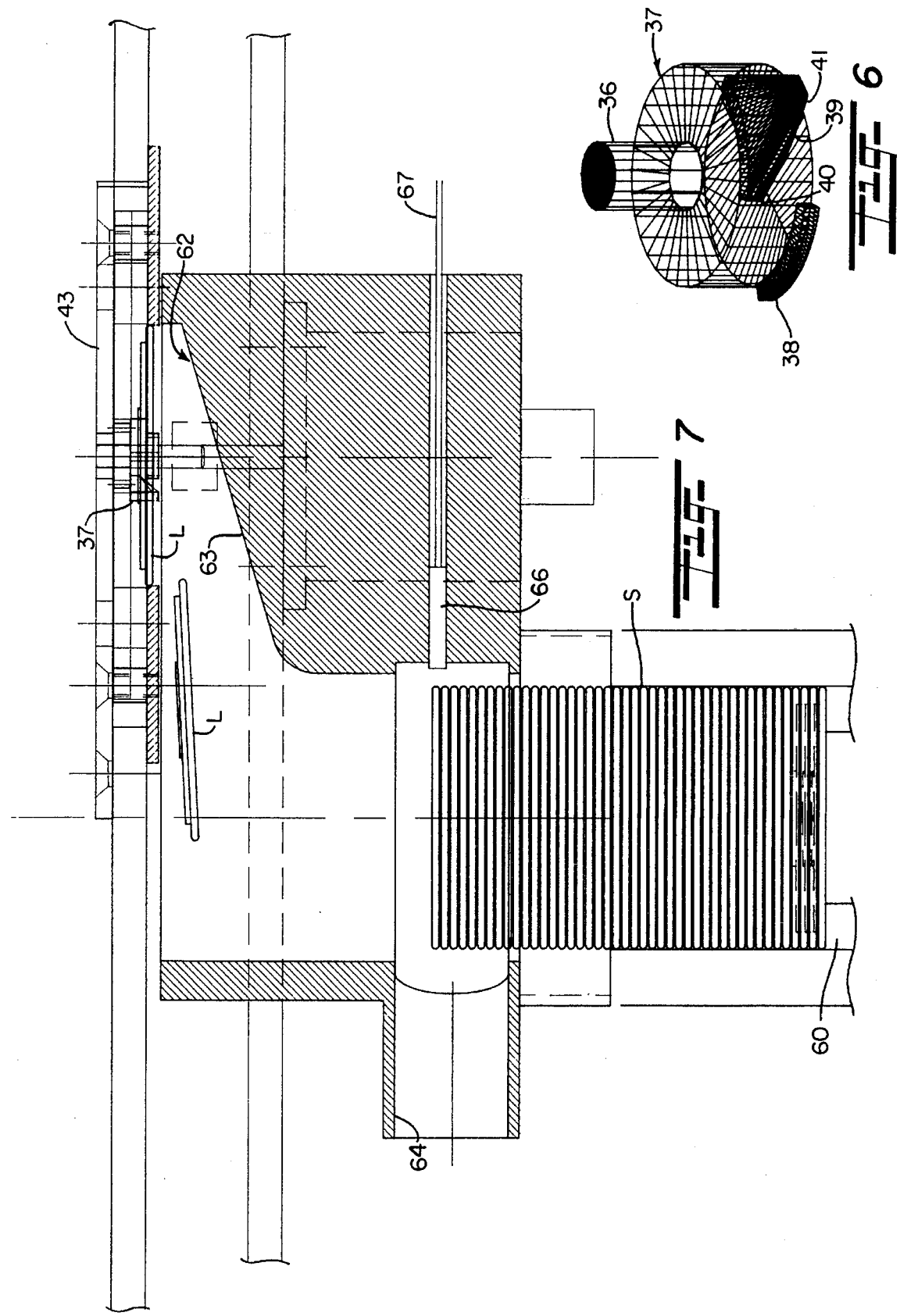

CAN END DISTRIBUTOR APPARATUS

SPECIFICATION

This invention relates to dispensing apparatus, and more particularly relates to a novel and improved apparatus for transferring flat articles, such as, can ends and the like from one or more can end feeder mechanisms into other stages of the can-forming operation in a highly automated but simplified manner.

BACKGROUND AND FIELD OF INVENTION

The transfer of can ends throughout the manufacturing line has become increasingly automated requiring close coordination between the delivery of ends from one or more downstacker mechanisms to a plurality of discharge stations. For example, it is desirable to be able to supply as many as 4400 ends per minute to one or more discharge lanes in a completely automated operation while occupying a minimum of space.

Downstacker mechanisms are commercially available which are capable of delivering ends from one or more chutes onto a starwheel for advancement into an end liner apparatus, for example, as set forth and described in U.S. Pat. No. 4,262,629 to McConnellogue et al. However, it is equally important to provide for positive advancement and discharge of the ends from the downstacker into a plurality of lanes or discharge chutes in such a way as to meet the ever-increasing demand for ends from various downstream equipment in addition to the end liner apparatus.

Of the systems that have been devised in the past, U.S. Pat. No. 3,938,675 to H. Rees employs intermeshing starwheels for advancing ends to one or more lanes with the aid of a lift plunger. U.S. Pat. No. 5,113,636 to H. Mihara et al discloses a can end feeding apparatus for advancing ends from a starwheel onto can bodies filled with liquid. U.S. Pat. No. 4,544,314 to E. S. Partyka is directed to a lane balancer having intermeshing starwheels to receive can ends from a screw mechanism including a primary discharge lane through which the bulk of the ends will pass from each starwheel and a secondary lane for receiving surplus ends; a vacuum plenum is used to aid in guiding the ends. Other patents of interest in this area are U.S. Pat. Nos. 2,108,522 to C. N. Bergmann; 3,977,358 to A. Stroobants; 4,326,624 to N. Ewertowski et al; 4,391,372 to F. L. Calhoun, 4,848,060 to C. S. Kubis et al, 4,874,076 to H. Kaplan et al and 5,133,636 to R. E. Hunt et al.

SUMMARY OF INVENTION

It is an object of the present invention to provide for a novel and improved lane modulator for distributing can ends from one or more can feeder units to downstream equipment in a simplified and highly efficient and fully automated manner.

It is another object of the present invention to provide a novel and improved can end distributor apparatus which is closely coorelated in its operation with the advancement of ends from one or more downstacker mechanisms to deliver said ends to one or more discharge lanes and to effectuate same in a closely coordinated sequence of steps.

It is a further object of the present invention to provide for lane distributor apparatus for feeding articles, such as, can ends and the like from a plurality of stacks of ends to a plurality of discharge lanes and in such a way as to be capable of balancing the supply of ends to each discharge lane according to the demand for ends placed on that lane.

It is an additional object of the present invention to provide for novel and improved lane distributor apparatus which is conformable for use with various types of downfeed mechanisms in such a way as to assure positive removal and displacement of each end into a selected stack of ends in a fully automated sequence of operations.

In accordance with the present invention, apparatus has been devised for transferring flat articles, such as, can ends and the like from one or more stacks of ends to one or more discharge lanes, a starwheel having a plurality of circular pockets at spaced circumferential intervals around its outer periphery and which pockets are successively advanced into registry with ends advanced one at a time from a stack of ends, each pocket including can end-receiving means along an outer peripheral portion thereof engageable with an outer rim of an individual can end advanced into the pocket, pocket drive means associated with each pocket for positively removing each end from the pocket, and at least one discharge chute aligned in the path of movement of each end removed from the pocket including guide means for guiding each end from the pocket into the discharge chute.

In its preferred form, an important feature of the present invention resides in the starwheel in which the pocket drive means are so constructed and arranged as to be incorporated into the profile of the starwheel so that the starwheel is capable of advancing through the limited clearance afforded between the downstacker chute and guide track of conventional downstacker apparatus; and further in such a way as to assure that each end can be positively advanced into a respective pocket. The pocket drive means takes the form of feed screw elements arranged around the periphery of the pocket with a ledge to receive each end and a ramp to advance the end downwardly out of the pocket into a discharge chute when selectively activated at a particular discharge station. Each discharge chute in turn includes an exit track which in cooperation with vacuum-applying means assures that the end will maintain the proper orientation to move into nested relation to a stack of ends in the discharge chute.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 4 is another enlarged view in more detail of an individual pocket of the starwheel transfer apparatus;

FIG. 5 is a cross-sectional view of the ring gear shown in FIG. 4 with individual feed screw elements shown in full;

FIG. 6 is an isometric wire frame view of an individual feed screw element;

FIG. 7 is a cross-sectional view taken through one of the vacuum discharge chutes of the starwheel transfer apparatus.

DETAILED DESCRIPTION OF PREFERRED EMBODIMENT

Figure 1:
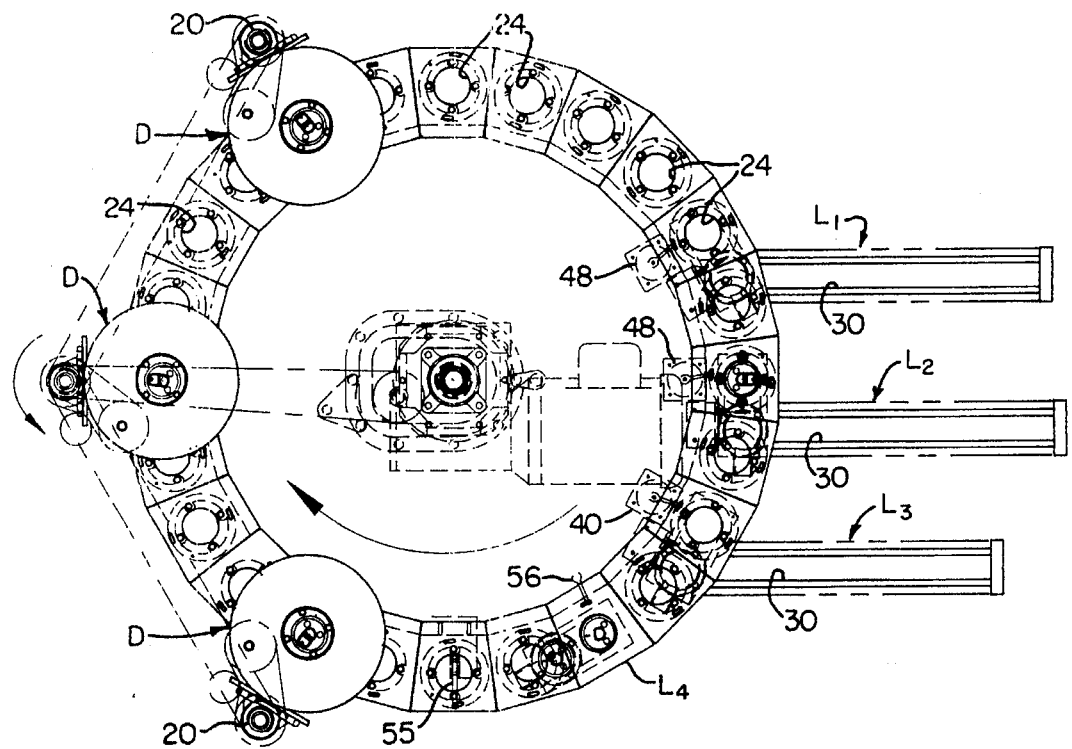
FIG. 1 is a plan view of a preferred form of apparatus in accordance with the present invention.

Referring in detail to the drawings, a conventional downstacker unit is broadly designated at D and may be of a type disclosed in the '629 patent with the exceptions to be hereinafter noted. Generally, however, a delivery tube or chute C effects continuous delivery of can ends L into the downstacker discharge area 12 where the can ends are disposed upside down in the stack and individually advanced by a pair of feed screws 14. Cut-off blades, not shown, are located on opposite sides of and above the feed screws in order to interrupt feeding of the can ends through the downstacker area, for example, in the event of jamming. Again, the feed screws 14 are mounted on shafts 18 so as to be disposed below the cut-off blades, and the shafts 18 are synchronously rotated by a main jack shaft 20 to one side of the downstacker housing. The jack shaft 20 may drive one or more downstackers D but, most importantly, to leave the area beneath the feed screws clear for advancement of a starwheel 22 of the type having full pockets in the form of circular openings 24 arranged at equally spaced circumferential intervals around the outer periphery of the starwheel 22. The starwheel is driven or advanced by a starwheel shaft 25 forming a part of motor drive 26 through a speed reducer 27, and the jack shaft 20 is operated off of the speed reducer 27 through any suitable form of power transmission belt as represented at 28 so that the rotation of the jack shaft 20 is correlated with the rotation of the starwheel shaft 25 via the speed reducer 27.

An important feature of the present invention resides in the construction and arrangement of each of the starwheel pockets 24 and their cooperative relationship to a series of vacuum chutes 30 at selected discharge stations or lanes as represented at $L_1$, $L_2$ and $L_3$. As best seen from FIGS. 3 to 6, each starwheel pocket 24 comprises an outer ring gear 34 having gear teeth 35 extending circumferentially around an inner surface of the gear and which teeth intermeshingly engage with complementary teeth 35' on an outer circumferential portion of shaft 36 of each feed screw 37. There are four feed screws 37 at equally spaced or 90° intervals around the periphery of the ring gear 34, and as best seen in FIG. 6 each feed screw 37 has an arcuate projection in the form of a horizontal ledge 38 at the lower end of the shaft 36 and a generally helical ramp 39 which slopes downwardly from a point spaced above a trailing edge of the ledge 38, as indicated at 40, to a point 41 at the bottom edge of the shaft 36.

Each ring gear 34 is affixed by means of suitable fasteners, not shown, within a generally trapezoidal bracket 43 which is placed in the outer periphery of the starwheel 22 so that each ring gear 34 is substantially flush with the upper edge of the starwheel 22, the feed screws 37 projecting equidistantly in a radial direction into the opening of each pocket 24. The ring gear 34 is normally disposed in intermeshing engagement with each feed screw 37 such that the ledges 38 face radially inwardly to form a support for each can end L released from a downstacker chute C as the starwheel 22 is continuously rotated through the area 12.

A trip pin 46 is located on each ring gear 34 and projects downwardly into the path of movement of a rotary control arm 47 which is activated by a rotary solenoid 48 to rotate into a position in the path of movement of the trip pin 46, the trip pin 46 being slidable in a circumferential slot 42 in the bracket 43. When engaged by the control arm 47, the trip pin 46 will cause the feed screws 37 to rotate through a limited arc necessary to rotate the inclined ramps 39 into engagement with the can end while the ledges 38 simultaneously rotate away from engagement with the end. The end is thereby positively advanced downwardly by the ramps 39 from the starwheel pocket 24 into a discharge chute 30.

Figure 2:
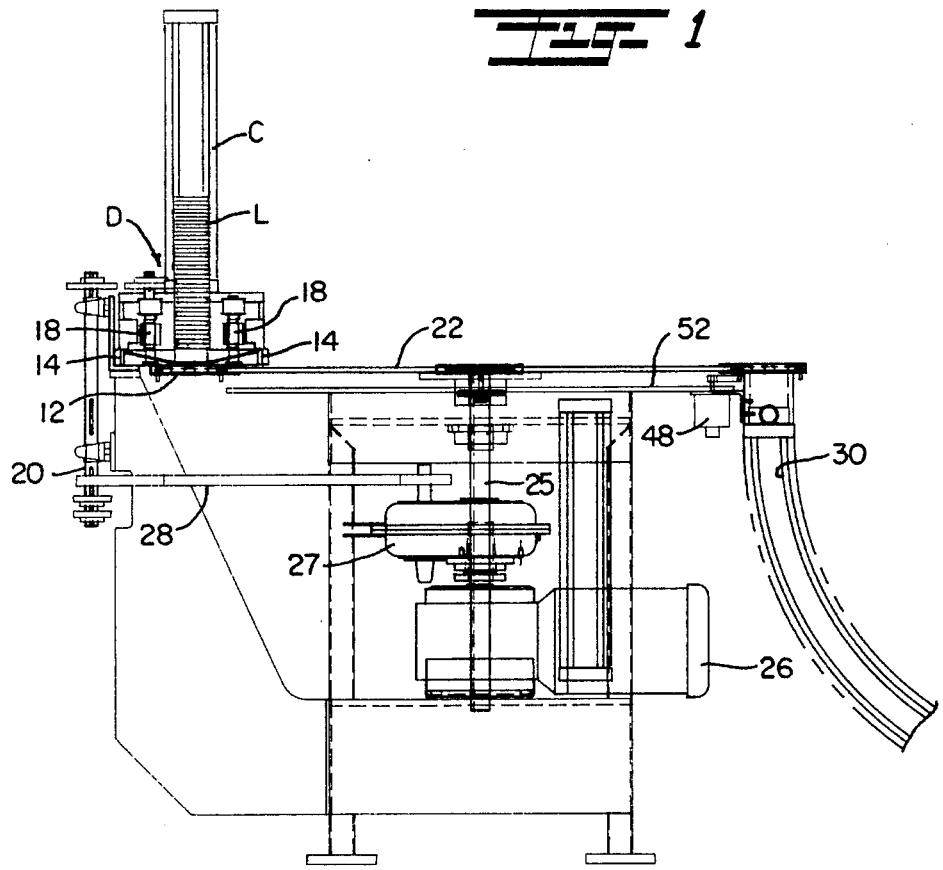
FIG. 2 is a front view in elevation of the apparatus illustrated in FIG. 1.
Figure 3:
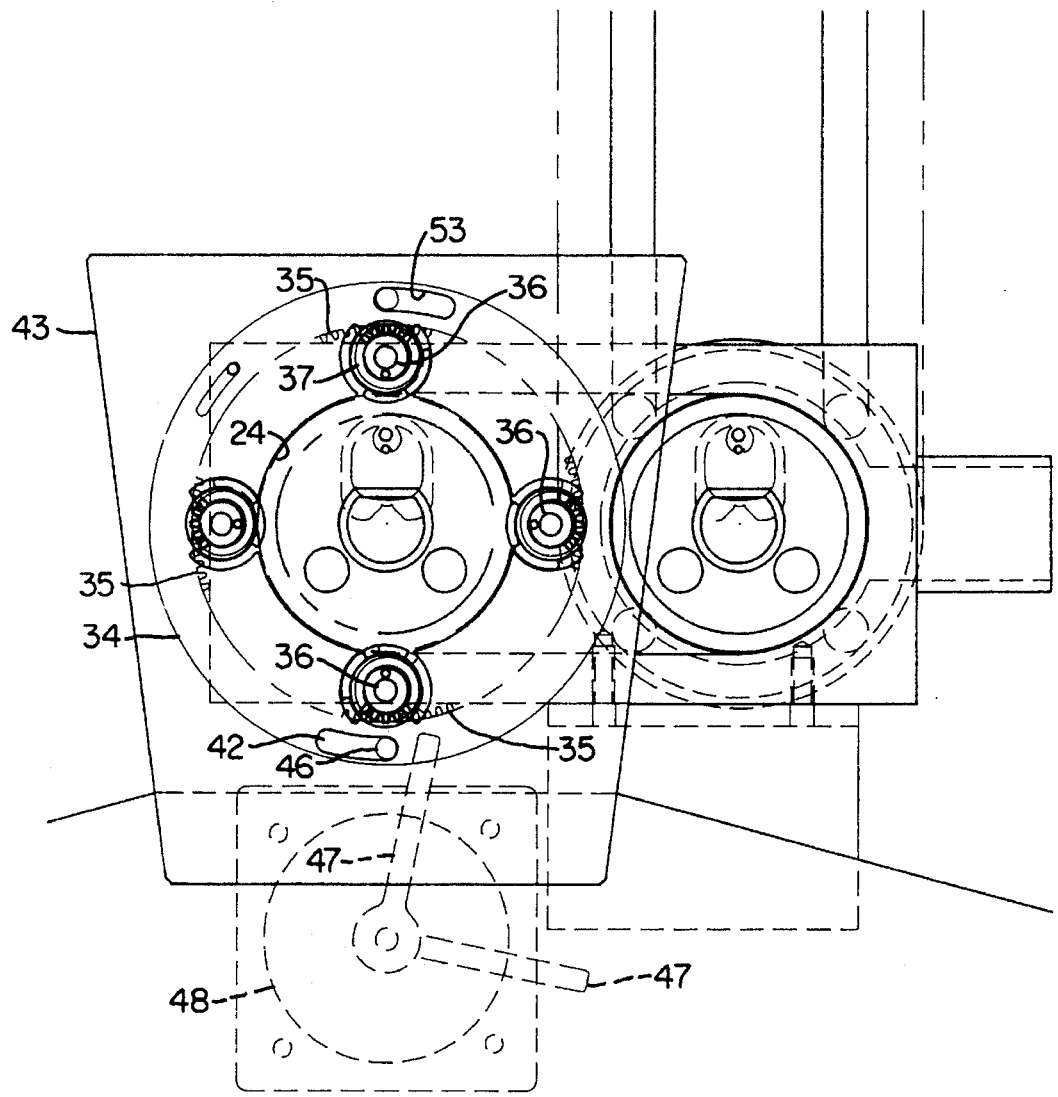
FIG. 3 is a plan view enlarged of individual pockets of the starwheel transfer apparatus in accordance with the present invention.

One or more rotary solenoids 48 may be positioned beneath the starwheel surface and, for example, as shown in FIG. 2, are mounted on a separate platform 52 which is journaled with respect to the starwheel shaft 25. Each ring gear 34 also carries a reset pin 54 inserted in slot 53 of the mounting bracket 43 and in diametrically opposed relation to each trip pin 46. The pin 54 is engaged by a stationary reset arm 55, shown in FIG. 1, after the ring gear 34 has passed the discharge chutes 30 and approaches the downstackers D to return the ring gear to its original end-supporting position after the trip pin 46 has cleared the control arm. Similarly, the control arm 47 is spring-loaded so that when the solenoid 48 is deactivated, the control arm 47 will return to its original position out of the path of movement of the trip pins 46. One or more rotary solenoids 48 may be positioned at spaced stations along the path of travel of the starwheel away from the downstacker mechanism, there being a series of three solenoids 48 illustrated in FIG. 1, each solenoid 48 being positioned in alignment with one of the vacuum chutes 30. Prior to movement of the starwheel 22 past the reset arm 55, a separate trip arm 56 mounted on the platform 52 engages each trip pin 46 to cause rotation of the ring gear in each successive starwheel pocket 24 and assure that all ends have been removed prior to reentry of each pocket 24 into the downstacker area.

Figure 8:
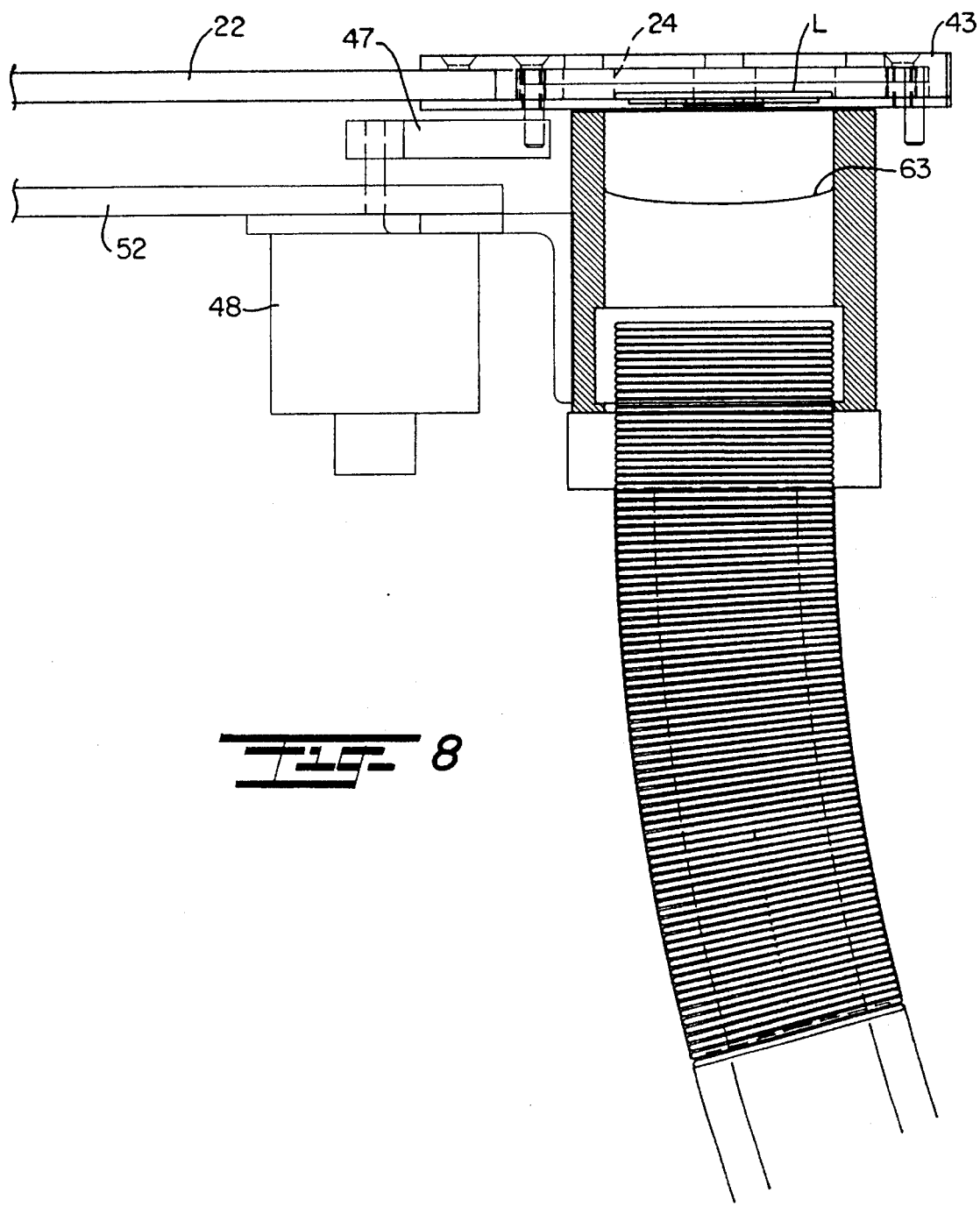
FIG. 8 is another cross-sectional view taken through another one of the vacuum discharge chutes.

As shown in FIGS. 7 and 8, each vacuum chute 30 is characterized by having a generally tubular passageway 60 with an enlarged or flared entrance 62 which has a surface 63 sloping downwardly in the direction of circumferential movement of the can ends past each discharge chute 30. Thus, as each can end L is released by a solenoid 48, the ring gear 34 will have moved into alignment with the entrance 62, and the end will be free to drop through that entrance area to be collected in the passageway 60. A vacuum connection is established at 64 in order to assist in drawing each end downwardly and to move into registry with the stack of ends collected in the passageway 60. Preferably, this vacuum connection 64 is located directly beneath the sloping surface 63 and above the passageway 60 so as to maintain proper orientation of each end L in advancing into nested relation with the stack of ends S. A sensor element 66 is disposed at the upper end of the passageway 60 and which, for example, may be an inductive sensor having a wire 67 leading into appropriate logical circuitry, not shown, to sense the input level of the stack of can ends S in the passageway. When one of the sensors 66 signals a requirement for ends, the logic will then energize the associated rotary solenoid 48 to trip the arm 46 of each successive pocket 24 until the sensor 66 indicates a full condition. Additional outfeed sensors 66 may be positioned at spaced intervals in each passageway to indicate a low level in the respective passageway before it is completely filled in which event the logic will cause ends to be discharged to those passageways or tracks 60 indicating a requirement for ends. FIG. 8 is a view taken at right angles to FIG. 7 to illustrate the interrelationship between the rotary solenoid 48 and trip arm 47.

In a typical operation which is given for the purpose of illustration but not limitation, three lanes of ends are delivered into the downstacker units D, the ends L being advanced in succession into each starwheel pocket 24 and then transferred to a series of discharge lanes $L_1$, $L_2$ and $L_3$ for discharging the ends L to a downstream machine, such as, an end liner or a conversion press. In addition, another discharge station or lane $L_4$ beneath the stationary arm 56 may serve as an input to a tray palletizer in the event that the downstream machines should go down or not be operative. The control concept for the apparatus of the present invention is based on demand for ends from the downstream equipment plus the availability and speed of equipment feeding ends to the apparatus. Each of the infeed downstackers D has a cut-off knife as described to control the end feed to the feed screws in each downstacker D which deposit the ends in the pockets 24 of the transfer starwheel 22. Input level sensors, not shown, along with end demand information from the downstream equipment including the outfeed sensor 66 will determine which cut-off knives should be opened or closed. This timing, including compensation for solenoid, cylinder and air response time is accomplished in the logic; and, if required, response time of the solenoid 48 is measured and used to determine the amount of time needed to advance the signal for each open and closed operation. Again, discharge of the ends from the starwheel 22 is based on the outfeed level sensor 66 in each passageway or exit track 60. When a sensor 66 indicates a requirement for ends, the logic will energize the solenoid 48 to trip the ring gear associated with each pocket until the sensor indicates a full condition as described.

Generally, the ends per minute handled is governed by the revolutions per minute and number of pockets 24 in the starwheel 22. Appropriate balance of the ends out vs. ends being fed to the starwheel is controlled by a variable speed drive in the manner described and in association with the various infeed and outfeed sensors. Speed and/or demand information from the upstream and downstream equipment also may be employed by the logic controls to adjust the speed and ends per minute through-put of the apparatus.

It will be evident that while the preferred form of apparatus as described employs vacuum discharge chutes 30, one or more of the chutes 30 may rely solely on gravity in directing ends as they are dropped out of each pocket 24, particularly where the vacuum chutes may extend in a downward vertical direction as at line $L_4$ and the end level maintained relatively near the entrance to the chute.

It is therefore to be understood that while a preferred form of apparatus has been herein set forth and described, various modifications and changes may be made without departing from the spirit and scope of the present invention as defined by the appended claims and reasonable equivalents thereof.

I claim:

1. In starwheel transfer apparatus for transferring can ends from one or more stacks of can ends to one or more discharge lanes and wherein a can end feeder includes means for advancing can ends one at a time from said stack, the improvement comprising:

a starwheel having a plurality of circular pockets at equally spaced circumferential intervals around an outer periphery thereof;

means for rotating said starwheel such that said pockets are successively advanced into registry with said ends advanced by said feeder;

each said pocket including can end-receiving means along an outer peripheral portion thereof to receive an individual can end advanced into said pocket;

pocket drive means associated with each said pocket for positively removing each said end from said pocket, said drive means including feed screw members at spaced circumferential intervals around said outer peripheral portion of each said pocket, said end-receiving means including a radially outwardly projecting ledge on each of said feed screw members, each of said feed screw members including a ramp portion engageable with each said end disposed on said can end-receiving means to displace said end downwardly and away from said pocket when said feed screw members are rotated, and means for rotating said feed screw members to cause said ramp portions to displace said can end from said pocket; and guide means for guiding each said end removed from said pocket away from said starwheel.

2. In starwheel transfer apparatus according to claim 1, including means for activating said drive means when said pocket moves into alignment with a discharge chute.

3. In starwheel transfer apparatus according to claim 1, said guide means including a flared end portion at one end of a discharge chute and vacuum-applying means for drawing each said end removed from each said pocket through a flared end of said discharge chute.

4. In starwheel transfer apparatus for distributing can ends from at least one stack of can ends to one or more discharge lanes and wherein a can end feeder mechanism includes means for advancing can ends one at a time from each said stack, the improvement comprising:

a starwheel having a plurality of closed circular pockets at equally spaced circumferential intervals around an outer periphery thereof;

means for rotating said starwheel whereby said pockets are successively advanced into registry with said ends advanced by said feeder mechanism;

drive means associated with each said pocket for positively removing each said end disposed in said pocket, said drive means including means mechanically engaging an outer rim of each said end and advancing said end from said pocket; and a plurality of discharge stations, each said station having a discharge chute aligned in the path of movement of said end removed from a respective one of said pockets including means for guiding each said end away from a respective pocket, and activating means associated with each said station for selectively activating said drive means for a selected pocket.

5. In starwheel transfer apparatus according to claim 4, said guide means including a flared end portion at one end of said discharge chute, and said guide means having vacuum-applying means for drawing each said end from each pocket through said flared end portion of said discharge chute.

6. In starwheel transfer apparatus according to claim 4, said drive means including feed screw members at spaced circumferential intervals around said outer peripheral portion of each said pocket, a ring gear in outer surrounding relation to said feed screw members, and intermeshing teeth between said ring gear and said feed screw members.

7. In starwheel transfer apparatus according to claim 6, including means for rotating said ring gear when said pocket moves into alignment with said discharge chute thereby to synchronously rotate said feed screw members.

8. In starwheel transfer apparatus according to claim 7, said end-receiving means including a radially outwardly projecting ledge on each of said feed screw members, said drive means including a helical ramp portion engageable with each said end disposed on said ledge when said feed screw members are rotated whereby rotating said feed screw members will cause said ramp portions to displace said can end downwardly and away from said pocket.

9. In starwheel transfer apparatus according to claim 8, said drive means including a trip member projecting from said ring gear, and said activating means including a first trip arm engageable with said trip member to rotate said ring gear in a direction causing said ramp portion to displace said end from said pocket into said discharge chute.

10. In starwheel apparatus according to claim 9, wherein said first trip arm is rotatable between a first position in the path of movement of said trip member and a second position away from the path of movement of said trip member, and solenoid-operated means for rotating said first trip arm between said first and second positions.

11. In starwheel transfer apparatus according to claim 9, including a stationary trip arm associated with one of said discharge stations disposed in the path of movement of said trip member.

12. In starwheel apparatus according to claim 9, including a reset member mounted in diametrically opposed relation to said trap member on said ring gear, and a reset arm disposed in the path of travel of said reset member for rotating said ring gear in a reverse direction to that rotated by said first trip arm.

13. In starwheel transfer apparatus for distributing can ends from a downstacker mechanism containing at least one stack of said ends and wherein said downstacker mechanism includes means for advancing said ends one at a time from each said stack of ends, the combination comprising:

a starwheel having a plurality of closed circular pockets at equally spaced, circumferential intervals around an outer periphery thereof, each said pocket being sized to receive one of said ends from one of said stacks of ends, means for rotating said starwheel whereby said pockets are successively advanced beneath said stack(s) of can ends for receiving an individual can end from one of said stacks;

each said pocket including a plurality of feed screw members in an outer peripheral edge portion thereof engageable with an outer rim of an individual can end received by said pocket, a ramp portion on each said feed screw member engageable with said end in said pocket, and means for synchronously rotating said feed screw members whereby said ramp portions displace said can end downwardly and away from said pocket; and guide means including a discharge chute for stacking said ends as they are removed from each said pocket.

14. In starwheel transfer apparatus according to claim 13, there being a plurality of discharge chutes at circumferential intervals beneath said starwheel, and activating means for activating said synchronously rotating means for each said pocket as said pocket moves into alignment with said discharge chute whereby to displace said end from said pocket into said guide means.

15. In starwheel transfer apparatus according to claim 13, said synchronously rotating means including a ring gear in outer surrounding relation to said feed screw members and in intermeshing engagement with tooth elements on each of said feed screw members.

16. In starwheel transfer apparatus according to claim 15, each said ring gear including a trip pin extending downwardly through a circumferential slot in said starwheel, said activating means including a trip arm engageable with said trip pin to rotate said ring gear.

* * * * *